(12) United States Patent
Redlich et al.

(10) Patent No.: US 10,266,110 B2
(45) Date of Patent: Apr. 23, 2019

(54) APPLICATION ARRANGEMENT FOR MOTOR VEHICLES

(71) Applicant: Dr. Ing. h.c. F. Porsche Aktiengesellschaft, Stuttgart (DE)

(72) Inventors: Heinz Redlich, Vaihingen-Enz (DE); Burkhard Leutiger, Pforzheim (DE); Alexander Rabek, Calw (DE); Malte Moessner, Stuttgart (DE)

(73) Assignee: DR. ING. H.C. F. PORSCHE AKTIENGESELLSCHAFT, Stuttgart (DE)

( * ) Notice: Subject to any disclaimer, the term of this patent is extended or adjusted under 35 U.S.C. 154(b) by 116 days.

(21) Appl. No.: 14/993,100

(22) Filed: Jan. 12, 2016

(65) Prior Publication Data

US 2016/0200243 A1    Jul. 14, 2016

(30) Foreign Application Priority Data

Jan. 14, 2015    (DE) .......................... 10 2015 100 473

(51) Int. Cl.
*G02F 7/00* (2006.01)
*B60Q 1/56* (2006.01)
(Continued)

(52) U.S. Cl.
CPC .................. *B60Q 1/56* (2013.01); *B60Q 1/26* (2013.01); *B60R 13/10* (2013.01); *G02B 6/005* (2013.01);
(Continued)

(58) Field of Classification Search
CPC ............ B60Q 1/26; B60Q 1/30; B60Q 1/323; B60Q 1/56; B60Q 3/12; G02B 5/128; G02B 5/136; G02B 6/0021; G02B 6/0055; G02B 6/0086; G02B 6/0088; G09F 13/04; G09F 13/0413; G09F 13/10; G09F 13/14;
(Continued)

(56) References Cited

U.S. PATENT DOCUMENTS 2,094,436 A  *  9/1937  Van Deventer ......... G09F 13/04
                                                                      40/545
2,157,772 A  *  5/1939  McCann ............... G02B 6/0081
                                                                      340/328
(Continued)

FOREIGN PATENT DOCUMENTS

DE         20109237 U1      8/2001
DE      102009028937 A1     3/2011
(Continued)

OTHER PUBLICATIONS

Japanese Reason for Rejection, dated Sep. 13, 2016, pp. 1-5.

*Primary Examiner* — Jong-Suk (James) Lee
*Assistant Examiner* — Hargobind S Sawhney
(74) *Attorney, Agent, or Firm* — Leydig, Voit & Mayer, Ltd.

(57) ABSTRACT

An application arrangement for motor vehicles includes a light face having a surface that is at least one of light-emitting or light-reflecting so as to emit and/or reflect light in a planar fashion. A transparent cover panel is assigned to the surface and forms an external face of the application arrangement. A plurality of separate application elements are disposed on the surface so as to at least partially screen the light of the light face from the external face.

16 Claims, 2 Drawing Sheets

(51) Int. Cl.
*F21V 8/00* (2006.01)
*B60Q 1/26* (2006.01)
*B60R 13/10* (2006.01)
*G09F 7/00* (2006.01)
*B60Q 1/32* (2006.01)
*G09F 13/04* (2006.01)

(52) U.S. Cl.
CPC ............... *G02B 6/006* (2013.01); *G09F 7/00* (2013.01); *B60Q 1/323* (2013.01); *G09F 2013/044* (2013.01)

(58) Field of Classification Search
CPC ............ G09F 13/16; G09F 13/18; G09F 7/00; G09F 2013/0422; G09F 2013/045; G09F 2013/222
See application file for complete search history.

(56) References Cited

U.S. PATENT DOCUMENTS

| | | | | |
|---|---|---|---|---|
| 4,424,449 A | * | 1/1984 | O'Brill | G09F 13/20 250/461.1 |
| 4,457,089 A | | 7/1984 | Phillips, Jr. | |
| 4,639,724 A | * | 1/1987 | Togneri | H02B 15/02 340/815.56 |
| 4,645,970 A | | 2/1987 | Murphy | |
| 5,500,638 A | | 3/1996 | George et al. | |
| 7,248,169 B2 | * | 7/2007 | Mimura | G02B 5/045 340/572.7 |
| 7,837,376 B2 | * | 11/2010 | Wu | G02B 6/0063 362/607 |
| 8,016,467 B2 | | 9/2011 | Eberwein | |
| 2007/0152834 A1 | | 7/2007 | Mimura | |

FOREIGN PATENT DOCUMENTS

| | | |
|---|---|---|
| EP | 0704342 A2 | 4/1996 |
| GB | 1468640 A | 3/1977 |
| JP | 50133848 A | 10/1975 |
| JP | 60226336 A | 11/1985 |
| JP | 6241246 Y2 | 10/1987 |
| JP | 2006066133 A | 3/2006 |
| WO | WO 2004034357 A1 | 4/2004 |

* cited by examiner

APPLICATION ARRANGEMENT FOR MOTOR VEHICLES

CROSS REFERENCE TO RELATED APPLICATIONS

Priority is claimed to German Patent Application No. DE 10 2015 100 473.9, filed on Jan. 14, 2015, the entire disclosure of which is hereby incorporated by reference herein.

FIELD

The present invention relates to an application arrangement, in particular an illuminated decorative and/or characterizing application for motor vehicles, comprising a light face which has a light-emitting and/or light-reflecting surface, in order to emit and/or reflect light in a planar fashion, and comprising a transparent cover panel which is assigned to the surface and forms an external face of the application arrangement.

The present invention also relates to a rear trim arrangement for motor vehicles.

BACKGROUND

Such application arrangements form numerals, characters, symbols or lettering on motor vehicles in order, for example, to indicate types, models or brands.

From the prior art it is generally known to illuminate displays from the rear or to illuminate decorative bodies or decorative elements from the rear in order to make them visible, wherein the corresponding lettering and decorative elements are embodied as cutouts in a diaphragm, with the result that the inner contour of the cutout forms the lettering or the decorative element. A corresponding decorative element is known, for example from U.S. Pat. No. 4,457,089.

It is disadvantageous here that only one corresponding inverse representation of the lettering or of the decorative element or of the application is formed, as a result of which the light emission face is small and the corresponding lettering or the decorative element is not clearly visible.

SUMMARY

In an embodiment, the present invention provides an application arrangement for motor vehicles including a light face having a surface that is at least one of light-emitting or light-reflecting so as to emit and/or reflect light in a planar fashion. A transparent cover panel is assigned to the surface and forms an external face of the application arrangement. A plurality of separate application elements are disposed on the surface so as to at least partially screen the light of the light face from the external face.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
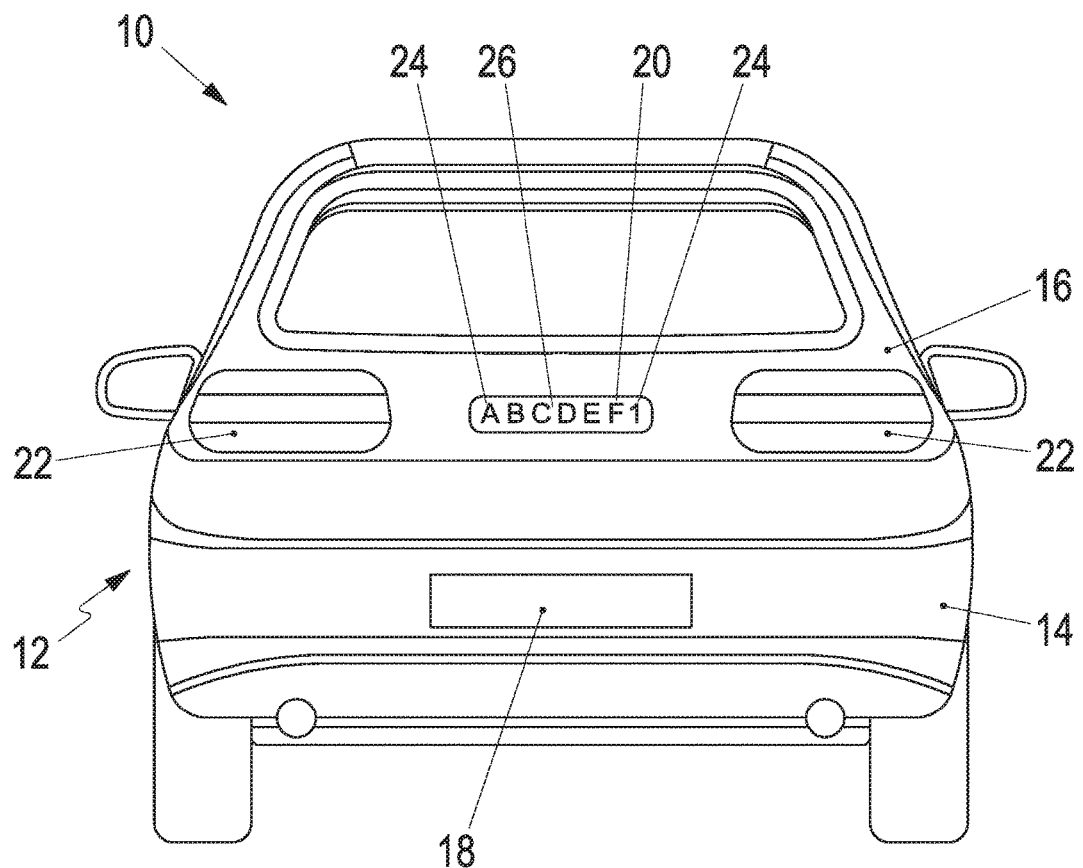
FIG. 1 shows a schematic view of a motor vehicle having an illuminated application arrangement.

An aspect of the present invention is therefore to provide an application arrangement, in particular a decorative and/or characterizing application, for motor vehicles, which can be recognized well in general.

In an embodiment, the present invention provides an application arrangement where a multiplicity of separate application elements are arranged on the surface and screen the light of the light face at least partially from the external face.

In an embodiment, the present invention provides, a rear trim arrangement by means of such an application arrangement.

By virtue of the fact that the separate application elements are arranged on the surface, the light of the light face is at least partially screened from the external face, with the result that the application elements have a dark effect with respect to the light face. As a result, the application elements can correspondingly be perceived as back-lit characters, with the result that when there is low ambient illumination the application arrangement or the separate application elements can be seen better. In particular, as a result, it is at the same time also possible to achieve good visibility in the case of strong ambient illumination, since the separate application elements on the light face can form a strong contrast with respect to the surrounding face.

In one preferred embodiment, the application elements form a graphic and/or character application, wherein the application is formed by an outer contour of the application elements.

As a result, the application elements appear as dark faces with respect to the illuminated surface of the light face, with the result that good visibility of the dark application elements with respect to the bright underlying surface is possible.

It is also preferred if the application elements are arranged one next to the other and spaced apart from one another on the surface.

As a result, the legibility of the characters, numerals or applications is easily possible, since the separate application elements cannot float with respect to the illuminated background.

It is also preferred if the application elements are embodied as opaque elements.

As a result, the emission of light by the surface of the light face can be inhibited or prevented with little technical expenditure, with the result that the application elements appear as dark numerals or characters on the illuminated underlying surface.

It is particularly preferred here if the application elements are chrome elements which are attached to the surface of the light face.

As a result, customary lettering can be formed on a motor vehicle, which lettering can be recognized in the customary fashion with a metallic sheen in bright ambient light conditions.

In this context it is particularly preferred if the application elements are self-adhering separate chrome elements which are bonded to the surface of the light face.

As a result, simple mounting with low expenditure is possible.

It is also preferred if the light face is embodied as a lightguide, to which a light source is assigned in order to input light into the lightguide.

As a result, independent illumination of the light face is possible and generally good visibility of the application elements can be realized.

It is also preferred if the light face has a fluorescent face or layer.

As a result, ambient light or light from headlights of other vehicles can be used generally to illuminate the light face, wherein at the same time a diffuse and uniform distribution of light over the surface of the light face is possible.

It is also preferred if the light face has a reflective layer.

As a result, the light from headlights of other motor vehicles can be used to illuminate the surface of the light face and to make the application elements correspondingly visible.

It is also preferred if the cover panel is spaced apart from the surface.

As a result, a three-dimensional visual appearance can be achieved which imparts a particularly high-quality appearance.

It is also preferred if the light face has an elongated base body.

As a result, relatively long lettering can also be formed by the application arrangement.

It is particularly preferred here if the elongated base body of the light face is held in an elongated housing to which the cover panel is secured.

As a result, the application arrangement can be manufactured as a compact component, as a result of which the mounting of the application arrangement on a motor vehicle is possible with low expenditure.

It is also preferred here if the elongated housing forms, together with the cover panel, an enclosed interior space for the light face.

As a result, the application arrangement can be made available as an enclosed component, as a result of which soiling and ingress of moisture into the interior space can be avoided.

It is also preferred if the light face is arranged between a lightguide and a light diaphragm.

As a result, the light face can be illuminated with little technical expenditure and at the same time a defined boundary of the light face or of the illuminated surface can be made available.

It is also preferred if the housing has a U-shaped cross section with two limb sections lying opposite, wherein the lightguide and the diaphragm are each arranged parallel to the limb sections lying opposite.

As a result, the application arrangement can be realized in a compact fashion and at the same time uniform illumination of the light face can be made possible.

Overall, good visibility of the application elements can be achieved by means of the application arrangement, specifically both in the case of low ambient illumination and in the case of strong ambient illumination, since the separate application elements are back-lit by the light face and can generally form a contrast with respect to the light face.

Of course, the features mentioned above and the features which are still to be explained below can be used not only in the respectively specified combination but also in other combinations or alone without departing from the scope of the present invention.

A motor vehicle is illustrated in FIG. 1 in a schematic view from the rear and is generally denoted by 10. The motor vehicle 10 has generally a rear trim 12 which is formed by a bumper 14 and/or a tailgate 16, wherein a cutout 18 for a motor vehicle license plate is formed in the rear trim. In addition, an illuminated application arrangement 20, which is embodied separately from the taillights 22, is arranged in the rear trim 12.

The application arrangement 20 forms illuminated lettering which represents a type designation of the motor vehicle 10 or a brand name of the motor vehicle 10. The application arrangement correspondingly has a multiplicity of application elements 24 which are arranged one next to the other and are back lit by a light face 26, as is explained below in more detail. As a result, the lettering can be seen particularly well from the rear in the case of low external illumination and at the same time imparts a high-quality appearance of the motor vehicle 10. The application arrangement 20 can include not only lettering and numerals but also graphic elements, for example brand symbols or other graphic elements.

The light face 26 can generally be illuminated both from the inside by a light source (such as, e.g., light source 27 shown in FIG. 2) as well as by means of a fluorescent layer or a reflective layer in order to emit ambient light or the light of headlights from other vehicles and form a corresponding contrast for the application elements 24.

The application elements 24 are arranged as separate elements on the light face 26, wherein the application or the lettering is formed by an outer contour of the application elements 24 and the background face is correspondingly illuminated by the light face 26. As a result, the lettering or the application elements 24 appear dark with respect to an illuminated background, as a result of which particularly good visibility can be achieved and at the same time a high-quality appearance can be imparted.

Figure 2:
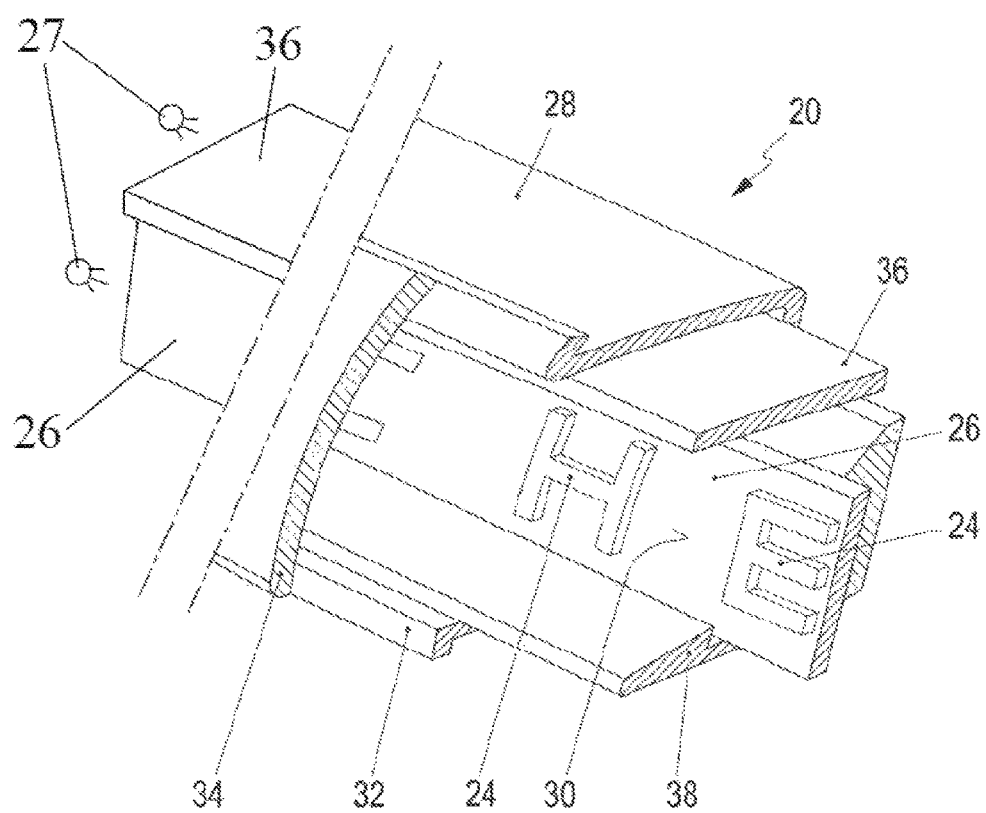
FIG. 2 shows a perspective sectional view through an illuminated application arrangement.

FIG. 2. illustrates a schematic perspective sectional view through the application arrangement 20.

The application arrangement 20 has in principle an elongated housing 28 which has a U-shaped cross section. The light face 26 with the application elements 24 is held in the U-shaped housing 28, wherein the light face 26 has a surface 30 which faces an opening 32 in the housing 28. A transparent covering glass 34 is arranged on the opening 32, said covering glass 34 closing off an interior space of the housing 28 from the outside and correspondingly forming on the external side an external face of the application arrangement 20 or of the rear trim 12.

The application elements 24 are arranged spaced apart on the surface 30 and form in this embodiment separate letters of lettering. The application elements 24 are here preferably chrome elements or chrome-colored plastic elements which are bonded to the surface 30 by means of a bonding agent. The application elements 24 usually have a bonding layer, with the result that an arrangement of the application elements 24 on the surface 30 is possible with little expenditure.

The light face is arranged in the housing 28 spaced apart from the covering glass 34 and is arranged essentially orthogonally with respect to a lightguide 36 and a light diaphragm 38. The light face 26 is preferably embodied as a lightguide, in that light (e.g., from light source 27 shown in FIG. 2) can be input via the lightguide 36, with the result that the surface 30 forms a light face and the application elements 24 are correspondingly back lit. The light diaphragm 38 is preferably formed from a matt and dark material in order to avoid reflections in the interior of the housing 28.

In one particular embodiment, the light face 26 can also have a fluorescent layer and/or a reflective layer, in order to correspondingly reflect light which is incident on the light face 26 or emit light which is input via the lightguide 36, with the result that a correspondingly uniform illumination can be made available. In one particular embodiment, the light face has on its surface 30 a colorless and transparent glass which has a thickness of approximately 2 mm. The lightguide 36 is preferably colorless, translucent, matt, milk-white sand-blasted, wherein the lightguide 36 has a thickness of approximately 3 mm. The housing 28 is preferably opaque and black, in order to keep away from the interior space of the housing 28 disruptive light reflections or light from other light sources such as, for example, the taillights 22.

The covering glass 34 forms an external surface of the rear trim 12 and preferably finishes flush with the rear trim 12, with the result that complete integration of the application arrangement 20 into the rear trim 12 of the motor vehicle 10 is possible.

Overall, it is therefore possible to make available on the rear of the motor vehicle 10 clearly visible lettering or a graphic symbol which is embodied separately from the taillights 22 and forms a correspondingly high-quality design element.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. An application arrangement for motor vehicles comprising:
   a light face including a light-reflecting surface, the surface being configured to reflect light in a planar fashion;
   a transparent cover panel assigned to the surface and forming an external face of the application arrangement; and
   a plurality of separate application elements disposed on the surface so as to at least partially screen the light of the light face from the external face,
   wherein the light face has an elongated base body held in an elongated housing to which the cover panel is secured,
   wherein the elongated housing forms, together with the cover panel, an enclosed interior space for the light face,
   wherein the elongated housing has a U-shaped cross section with two limb sections lying opposite,
   wherein the light face is arranged between a lightguide and a diaphragm, and
   wherein the lightguide and the diaphragm are each arranged parallel to the limb sections lying opposite.

2. The application arrangement as recited in claim 1, wherein the application is at least one of an illuminated decorative or illuminated characterizing application.

3. The application arrangement as recited in claim 1, wherein the application elements form at least one of a graphic or character application, and wherein the application is formed by an outer contour of the application elements.

4. The application arrangement as recited in claim 1, wherein the application elements are arranged one next to the other and spaced apart from one another on the surface.

5. The application arrangement as recited in claim 1, wherein the application elements are embodied as opaque elements.

6. The application arrangement as recited in claim 1, wherein the light face has a reflective layer.

7. The application arrangement as recited in claim 1, wherein the cover panel is spaced apart from the surface.

8. An apparatus comprising:
   a roar trim arrangement fir a motor vehicle comprising:
     an application arrangement including:
       a light face including a light-reflecting surface, the surface being configured to reflect light in a planar fashion;
       a transparent cover panel assigned to the surface and forming an external face of the application arrangement; and
       a plurality of separate application elements disposed on the surface so as to at least partially screen the light of the light face from the external face,
     wherein the light face has an elongated base body held in an elongated housing to which the cover panel is secured,
     wherein the elongated housing forms, together with the cover panel, an enclosed interior space for the light face,
     wherein the elongated housing has a U-shaped cross section with two limb sections lying opposite,
     wherein the light face is arranged between a lightguide and a diaphragm, and
     wherein the lightguide and the diaphragm are each arranged parallel to the limb sections lying opposite.

9. An application arrangement for motor vehicles comprising:
   a light face including a light-emitting surface, the surface being configured to emit light in a planar fashion;
   a transparent cover panel assigned to the surface and forming an external face of the application arrangement; and
   a plurality of separate application elements disposed on the surface so as to at least partially screen the light of the light face from the external face,
   wherein the light face has an elongated base body held in an elongated housing to which the cover panel is secured,
   wherein the elongated housing forms, together with the cover panel, an enclosed interior space for the light face, wherein the elongated housing has a U-shaped cross section with two limb sections lying opposite, wherein the light face is arranged between a lightguide and a diaphragm, and wherein the lightguide and the diaphragm are each arranged parallel to the limb sections lying opposite.

10. The application arrangement as recited in claim 9, wherein the light face including the light-emitting surface has a fluorescent face or fluorescent layer.

11. The application arrangement as recited in claim 9, wherein the application is at least one of an illuminated decorative or illuminated characterizing application.

12. The application arrangement as recited in claim 9, wherein the application elements form at least one of a graphic or character application, and wherein the application is formed by an outer contour of the application elements.

13. The application arrangement as recited in claim 9, wherein the application elements are arranged one next to the other and spaced apart from one another on the surface.

14. The application arrangement as recited in claim 9, wherein the application elements are embodied as opaque elements.

15. The application arrangement as recited in claim 9, wherein the light face including the light-emitting surface is embodied as a second lightguide, and wherein a light source is assigned to the light face so as to input light into the second lightguide.

16. The application arrangement as recited in claim 9, wherein the cover panel is spaced apart from the surface.

* * * * *